Figure 1:
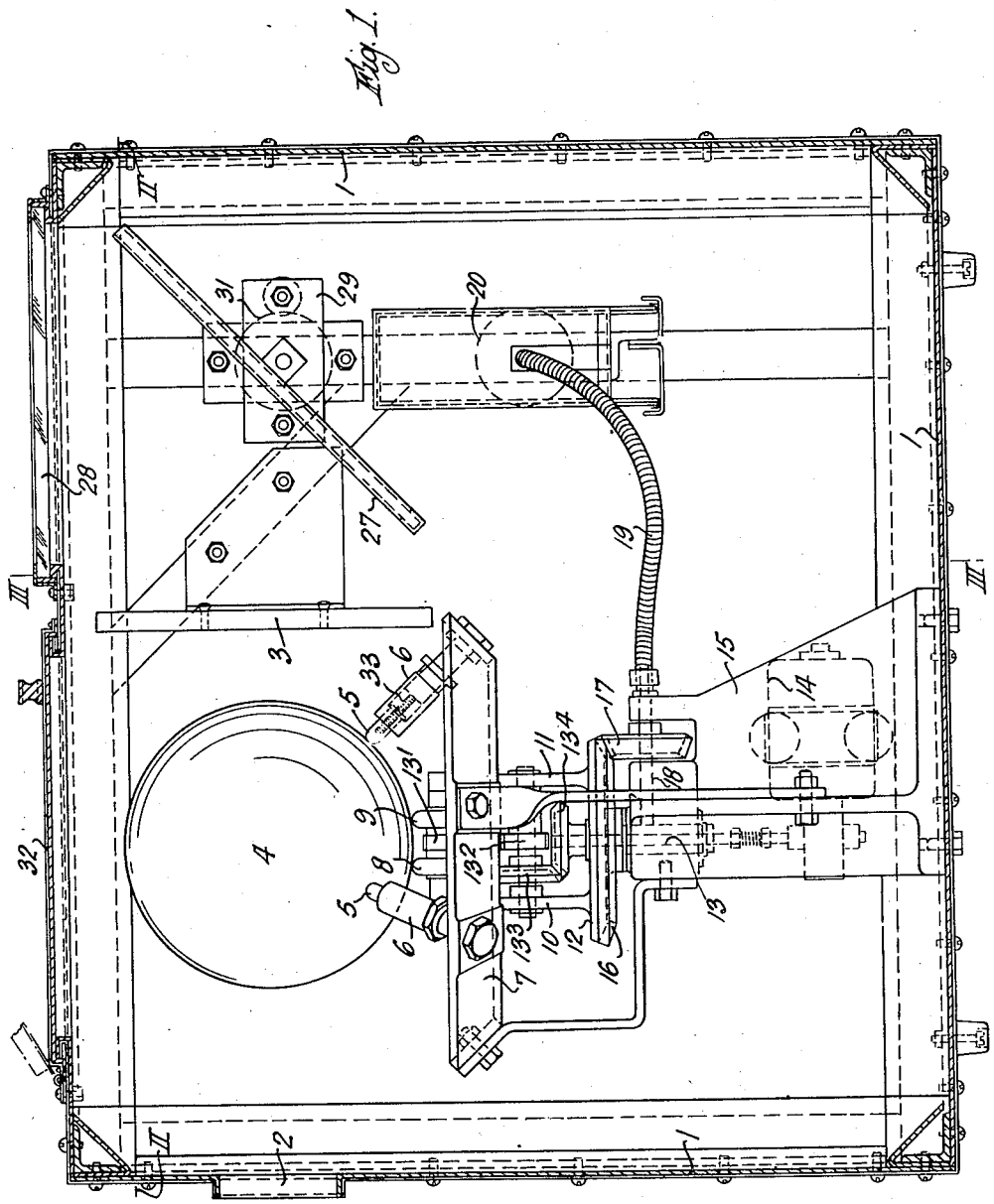

Oct. 8, 1940.  E. A. J. TUNNICLIFFE  2,217,262
LIGHT INSPECTION OR DISPLAY DEVICE
Filed March 6, 1940    4 Sheets-Sheet 2

Inventor:
E. A. J. Tunnicliffe
By Baldwin & Wight
his Attorneys

Oct. 8, 1940.  E. A. J. TUNNICLIFFE  2,217,262
LIGHT INSPECTION OR DISPLAY DEVICE
Filed March 6, 1940   4 Sheets-Sheet 3

Inventor:
E. A. J. Tunnicliffe
By Baldwin & Wight
his Attorneys

Oct. 8, 1940.  E. A. J. TUNNICLIFFE  2,217,262
LIGHT INSPECTION OR DISPLAY DEVICE
Filed March 6, 1940   4 Sheets-Sheet 4

Inventor:
E. A. J. Tunnicliffe
By Baldwin + Wight
his Attorneys

Patented Oct. 8, 1940

2,217,262

UNITED STATES PATENT OFFICE 2,217,262

LIGHT INSPECTION OR DISPLAY DEVICE

Edward Albert James Tunnicliffe, London, England

Application March 6, 1940, Serial No. 322,596
In Great Britain March 3, 1939

14 Claims. (Cl. 250—52)

This invention relates to a device for use in connection with light systems where it is required to suspend an article in a beam of X-rays or of light for inspection or display purposes.

According to the invention the device comprises a container, within or upon which the article to be examined or exhibited, is carried, the container having a spherical or cylindrical form so as to be capable of rolling movements about at least one axis, the container being supported by means contacting with the surface thereof in at least three points, and one of which points of contact comprises or consists of a driving member for rotating the same in relation to its supporting means, means being provided to change the direction of rotation of the container either by varying the plane of rotation of the driving member or by varying the position of the supporting means together with the driving member.

In one arrangement the supporting means including the driving member may be mounted to rotate as a unit about a vertical axis passing through the centre of the container or a point adjacent thereto.

One of the principal applications of the invention is in connection with the examination by X-rays of articles which are being tested for structural flaws. The use of X-rays for metallurgical examination, e. g., for testing the soundness of castings and machined articles is coming more and more to the fore with however the attendant difficulties in handling the articles to be examined, which are held in the path of the rays, when, by the use of a fluorescent screen, flaws will be shown up on the screen. The present practice is for the operator carrying out the test to hold the article in the path of the rays and to orient or rotate it about several axes according to the shape or character of the article so that it may be viewed from various angles. To protect the operator against the harmful effect of the rays, it is usual to employ a lead lined box or cabinet, which is traversed in one direction by the X-rays, which fall upon a fluorescent screen, the box having an aperture for the insertion of the article into the path of the rays. Usually also the operator is given lead protective gloves.

It is well known that these conditions of working cause considerable fatigue and towards the end of the day, the rate and quality of inspection will fall off considerably, due to fatigue on the part of the operator. The operator may even remove his or her gloves with subsequent danger of serious burns.

Furthermore the extent of movement of the article is extremely limited and parts of it where it is held must of necessity be obscured with consequent risk of missing a flaw.

Apparatus according to this invention provides a mechanical device for suspending the article to be examined, so to speak in mid-air, so that when once the operator has positioned the article, it is not necessary to hold it.

In the case of X-ray work, the points of support are arranged well below the horizontal diametric plane of the container, so that the rays have an unobstructed path through the container and its contents.

In the preferred arrangement, a completely spherical container is employed, the sphere being where necessary constructed in two separable portions or provided with a trap door to enable an article to be placed in its interior, where it is fixed by suitable ray translucent packing material. The container when for use in X-ray work would be constructed of aluminium, papier-mâché, or other material having a low opacity to X-rays.

With a spherical container, the container preferably has a three point contact with the support, and a separate co-operating frictional driving member, such as a disc or wheel is provided, the disc being so mounted in relation to the three contact points that it bears the greater portion of the weight of the container.

In carrying out this embodiment of the invention, there may be provided a platform having three equally spaced upstanding arms provided with spring pressed plungers or balls constituting the supporting points and mounted on the platform is an electric motor provided with the driving disc.

Provision may be made to rotate the platform by hand, or if desired by mechanical means.

Provision may also be made for varying the speed of rotation both of the member driving the container and of the drive to the platform, and for arresting the container at any particular point during rotation so that especially for X-ray examination a close scrutiny can be made in any position.

For most purposes a hand controlled drive platform will be found sufficient to meet requirements.

It will be appreciated that the suspension device would, for X-ray examination purposes, be housed within a lead lined cabinet, the upper wall having an opening to enable the container to be placed by hand on its points of suspension, and which is normally closed by a hinged or sliding cover plate. As an additional precaution a switch under the control of the door plate may be fitted so that as long as the door remains open the X-rays cannot be switch on. The door switch may if desired be automatic in the sense that it controls a master switch controlling the X-ray circuit.

The platform may be orientated by means of a spindle projecting from the side of the cabinet and provided with a suitable hand wheel. To facilitate control, a press switch may be fitted on the knob controlling the circuit of the driving motor on the platform.

For the X-ray testing of certain kinds of castings a cylindrical container may be found sufficient, the container in this case being supported at its ends on pairs of rollers one or more of which may be a driving roller.

Figure 2:
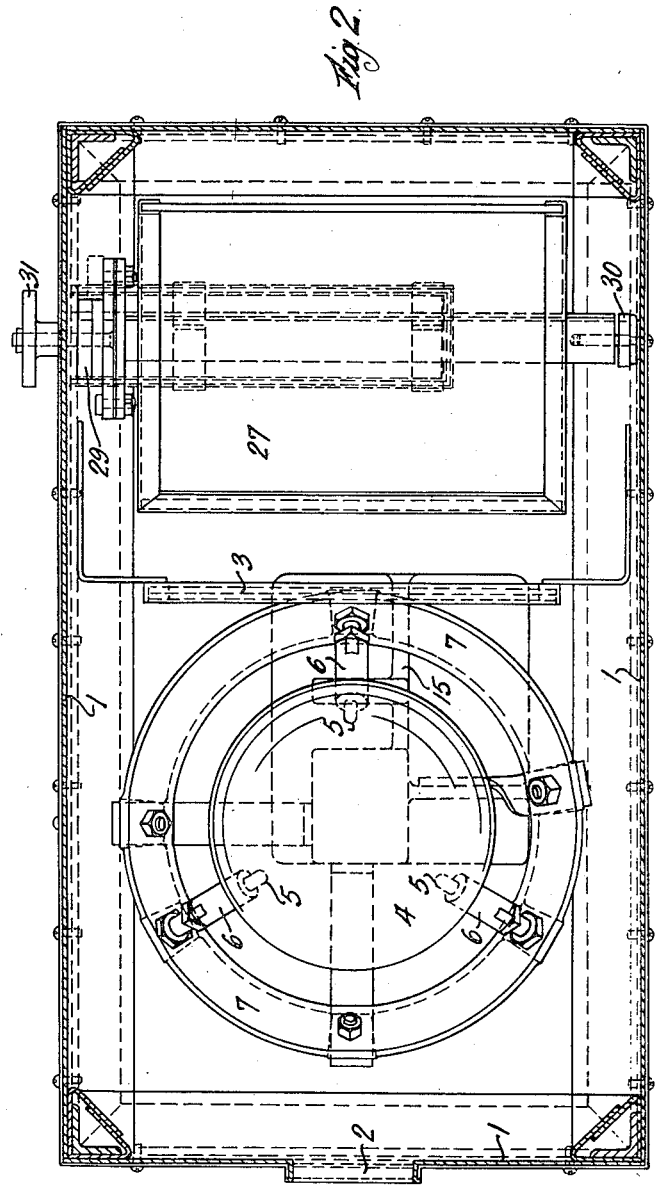
Figure 3:
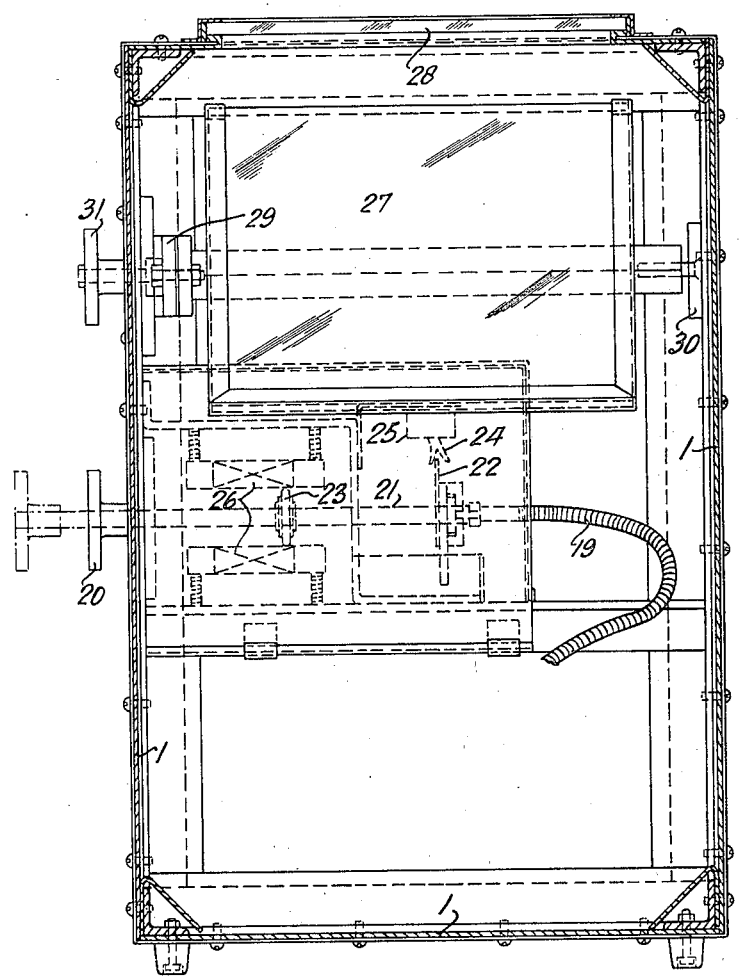
Figure 5:
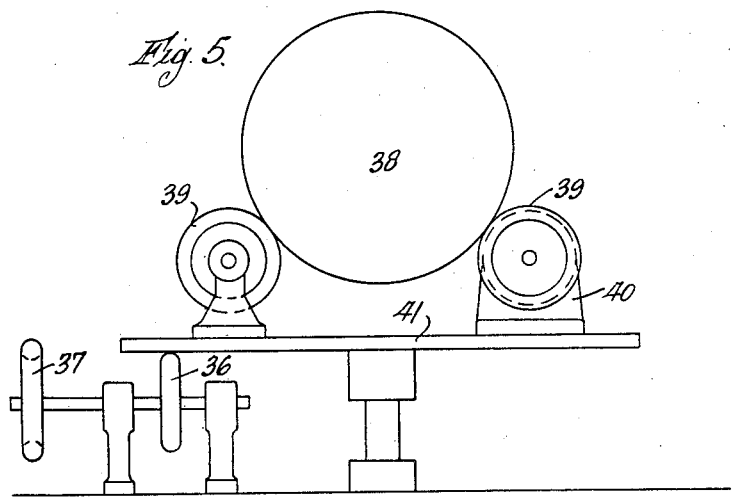
Figure 4:
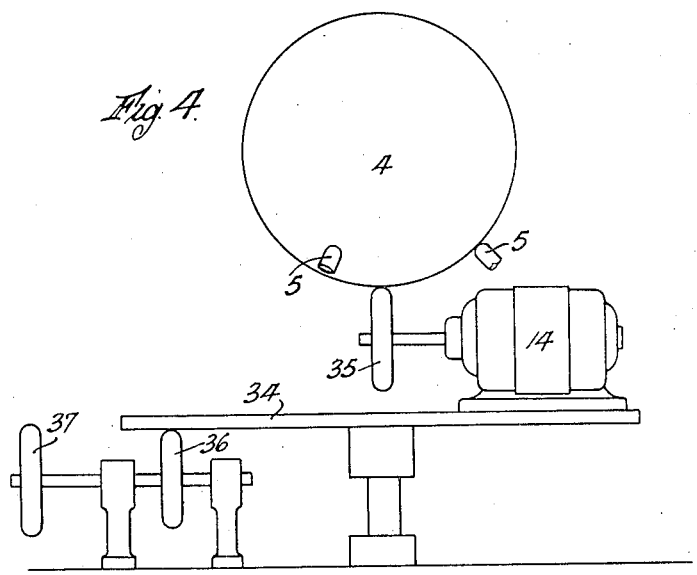

The invention is illustrated in the accompanying drawings in which Figures 1-3 are views of a form of apparatus for enabling an article to be X-rayed, Figure 1 being a longitudinal sectional elevation, Figure 2 a section on the line II—II Figure 1 and Figure 3 a section on the line III—III Figure 1, and Figures 4 and 5 are diagrammatic views of modified arrangements.

In the drawings and referring firstly to the arrangement shown in Figures 1-3, 1 indicates a lead lined case having an aperture 2 through which an X-ray beam is projected to a fluorescent screen 3 within the case. Also within the case, and in the path of the beam passing to the screen 3 is a sphere 4 which is hollow and is formed in two halves or is provided with a door so that an article to be X-rayed can be placed within the sphere. This sphere is formed of material having a low opacity to X-rays and is supported at three points, well below the diametral plane of the sphere, by the hemispherical ends of three pins 5, which are mounted in sockets 6 carried from a fixed platform 7; the pins are supported at such an angle that their axes (when produced) intersect at the centre of the sphere 4 the pins being symmetrically disposed about the vertical axis of the sphere.

Also engaging the periphery of the sphere 4 at points disposed symmetrically about the vertical axis of the sphere are two rollers 8, 9 rotatably supported between two arms 10, 11 rising from a plate 12 which can be moved angularly about the vertical axis of the sphere 4. These two rollers are driven through gear wheels 13¹, 13², 13³, 13⁴ from a spindle 13 itself driven by an electric motor 14 carried by a fixed support 15 from which the platform 7 is supported.

With the parts so far described it will be seen the sphere 4 is supported for rolling by a supporting system comprising the pins 5 and the rollers 8, 9 and that when the rollers 8, 9 are rotated, the sphere 4 will be caused to rotate about an axis parallel with the axis of rotation of the rollers 8, 9 or in other words, the plane of rotation of the sphere 4 is parallel with the common plane of rotation of the rollers 8, 9. In order now to enable the axis of rotation of the sphere 4 to be varied as desired, the plate 12 is arranged to be turned about the vertical axis of the sphere 4 so as to vary the plane of rotation of the rollers 8, 9 and hence of the sphere 4 in the following manner: the plate 12 is formed on its undersurface with bevel gear teeth 16 in mesh with a bevel pinion 17 on a shaft 18 connected to a flexible shaft 19 which extends through the case 1 to an operating hand wheel 20, so that by rotating the hand wheel 20 the plate 12 is, through the bevel gearing 16, 17, turned and so varies the axis of rotation of the rollers 8, 9 and hence of the sphere 4.

In the arrangement shown movement of the hand wheel 20 is arranged not only to control the position of the axis of rotation of the sphere 4 in the manner described; but also to control the speed of rotation of the sphere about that axis: this is effected by connecting the flexible shaft 19 to the hand wheel 20 by a slidable and rotatable rod 21, this rod having on it two control components 22, 23. The component 22 is in the form of a finger to engage in a jaw in a switch operating arm 24 which by its movement operates a switch 25 to close and open the circuit of the motor 14. The second component is in the form of the slider of a rheostat 26 which controls the current supply to and hence the speed of rotation of the motor 14.

Both of these components are operated by a sliding movement of the rod 21 and hence of the hand wheel 20 and it will be seen that by sliding the hand wheel to the left from the full line position shown in Figure 3, first the switch 25 is closed by the component 22 the other component being at one extreme end of the rheostat 26 and as the hand wheel continues to be moved to the left, the component 23 moves down the rheostat 26 so progressively cutting out the resistance in the circuit of the motor 14 and allowing this to run at increasing speed.

It will be apparent that this arrangement affords a convenient single point control of both the axis of rotation of the sphere 4 and of its speed of rotation, both controls being effected by manipulation of the single hand wheel 20.

When now an article to be X-rayed is placed within the sphere, an X-rayed image of the article will appear on the fluorescent screen 3, the apparatus enabling such an image to be produced from different view points on account of the rotation of the sphere 4 about different axes; if prolonged inspection from any particular viewpoint is desired this can readily be effected by operating the handwheel 20 to stop the motor 14.

The image of the fluorescent screen is projected for inspection from outside the case 1 by providing within the case a reflecting mirror 27 which reflects the image from the screen 3 on to a glass panel 28 let into the wall of the case 1. The mirror 27 is supported at its edges from swivel blocks 29, 30 one including a friction pad and one of the blocks is extended through the side wall of the case 1 to an operating hand wheel 31 by which the angle of the mirror may be adjusted.

An opening closed by a hinged lid 32 is also provided in the top of the case 1, the opening when the lid is opened being of sufficient dimensions to enable the sphere 4 to be removed to enable an article to be X-rayed, to be placed within the sphere.

It is preferred that the rollers 8, 9 shall take the major part of the weight of the sphere 4: this is achieved by providing each of the pins 5 with a coil spring 33 which biases the pin to move towards the centre of the sphere 4 so that when the sphere is placed in position on the pins the weight of the sphere 4 causes the pins to yield against the spring action and to enable the sphere to settle firmly on the rollers 8, 9.

In the modified arrangement shown in Figure 4, the motor 14 is carried by a platform 34 equivalent to the plate 12 in the arrangement of Figures 1-3 this platform being rotatable to vary the position of the axis of rotation of the sphere; in this case also the motor 14 has a driving wheel 35 affording a direct drive to the sphere 4 and in addition the platform is directly engaged by a wheel 36 fast with hand wheel 37 by which the platform can be rotated to vary the axis of rotation of the sphere 4.

Referring to Figure 5, the sphere 4 is replaced by a cylinder 38 and in this case, rollers 39 are provided to support the cylinder for rotation one of the rollers being driven by a motor 40 to rotate the cylinder 38. Moreover, to vary the position of the axis of rotation of the cylinder the supporting system comprising the rollers 39 is itself carried by a turntable 41 so that in this case, the whole of the supporting system is turned.

Obviously if the arrangements shown in Figures 4 and 5 are intended to be employed for the purpose of making X-ray examination, the arrangements would be located in a case similar to that described with reference to Figures 1-3.

While the device is intended mainly for use in connection with X-ray examination, I contemplate using it for advertising purposes, in which case an article, or an outline thereof, to be advertised may be mounted within the container, or attached to the peripheral surface thereof, the container being of translucent material or being provided with light translucent openings. Other advertising matter may if desired be marked on the outer periphery of the container. Another application of the invention is as a mounting for a globe bearing a projection of the earth.

What I claim is:

1. A device for inspection or display, the device having in combination a receiving body having at least a part of its periphery formed by a curved surface, a supporting system in which the receiving body is supported for rolling movement about at least one axis by contact with the said curved periphery of the body, the said supporting system including a rotatable member, means to rotate said rotatable member, and means to change the plane of rotation of said rotatable member to change the position of the axis about which the body rotates.

2. A device for inspection or display, the device comprising a spherical body, a supporting system engaging and so supporting the body by engagement with the periphery of the body that the body can roll, the system including a rotatable member, means to rotate the said rotatable member, and means to change the position of the axis about which the rotatable member rotates and so change the position of the axis of rotation of the sphere.

3. A device for inspection or display, the device comprising a cylindrical body, a movable supporting system engaging and so supporting the body by engagement with the curved periphery of the body that the body can roll about its longitudinal axis, the said system including at least one rotatable member, means to rotate said rotatable member, and means so to shift the supporting system bodily that the position of the longitudinal axis about which the cylindrical body rolls is also shifted.

4. For use in X-ray examination of articles, a device comprising an X-ray projection apparatus, a hollow sphere to receive the article to be X-rayed, a supporting system supporting the sphere for rolling movement in the path of the projected X-rays, the said system including components engaging the sphere by its periphery and the said system including a rotatable member, means to rotate said member to rotate the sphere, and means to shift the axis of rotation of the member and hence of the sphere.

5. For use in X-ray examination of articles, a device comprising an X-ray projection apparatus, a hollow sphere to receive the article to be X-rayed, a supporting system supporting the sphere for rolling movement in the path of the projected X-rays, the said system including components engaging the sphere by its periphery and the said system including a rotatable member, an electric motor to rotate said member, means to shift the position of the axis of rotation of said member, and a single control member controlling both the energisation of the electric motor and the said means to shift the axis of rotation of said rotatable member.

6. For use in X-ray examination of articles, a device comprising an X-ray projection apparatus, a hollow sphere to receive the article to be X-rayed, a supporting system supporting the sphere for rolling movement in the path of the projected X-rays, the said system including components engaging the sphere by its periphery and the said system including a rotatable member, an electric motor to rotate said member, a regulating device for regulating the operation of the motor, a single control member, means supporting the control member for sliding and rotational movement, and means to cause one of the two movements to operate the regulating device and the other movement to shift the axis of rotation of the said rotatable member.

7. For use in X-ray examination of articles, a device comprising an X-ray projection apparatus, a hollow sphere to receive the article to be X-rayed, a supporting system supporting the sphere for rolling movement in the path of the projected X-rays, the said system including three pins contacting the periphery of the sphere and a rotatable member, means to rotate said member to rotate the sphere, and means to shift the axis of rotation of the member and hence of the sphere.

8. For use in X-ray examination of articles, a device comprising an X-ray projection apparatus, a hollow sphere to receive the article to be X-rayed, a supporting system supporting the sphere for rolling movement in the path of the projected X-rays, the said system including three pins contacting the periphery of the sphere, spring means biasing the pins against the weight of the sphere and a rotatable member, means to rotate said member to rotate the sphere, and means to shift the axis of rotation of the member and hence of the sphere.

9. For use in X-ray examination of articles an X-ray projection apparatus, a hollow supporting body having at least a part of its periphery of curved formation, a supporting system supporting the body for rolling movement in the path of the projected X-rays by contact with the said curved periphery, the said system including a rotatable member, means to rotate the said rotatable member and means to shift the position of the axis of rotation of said rotatable member.

10. For use in X-ray examination of articles an X-ray projection apparatus, a hollow supporting body having at least a part of its periphery of curved formation, a supporting system supporting the body for rolling movement in the path of the projected X-rays by contact with the said curved periphery, the said system including a rotatable member, an electric motor to rotate said member, means to shift the position of the axis of rotation of said member, and a single control member controlling both the energisation of the electric motor and the said means to shift the axis of rotation of the said rotatable member.

11. For use in X-ray examination of articles, an X-ray projection apparatus, a hollow cylindrical supporting body to receive an article to be X-rayed, a movable supporting system supporting the body for rotation about its longitudinal axis in the path of the projected X-rays, the said system including at least one rotatable member, means to rotate said rotatable member, and means to shift the supporting system bodily to change the position of the longitudinal axis of rotation of the body.

12. For use in X-ray examination of articles, a case formed of material opaque to X-rays, a fluorescent screen in the case, an X-ray projection apparatus to project X-rays towards the screen, a hollow body to receive an article to be examined, the said body having at least a part of its periphery of curved form, a supporting system engaging the said curved periphery and supporting the body for rolling movement in the path of the X-rays, the said supporting system including a rotatable driving member, means to rotate said rotatable member and means to change the position of the axis about which said rotatable member rotates.

13. For use in X-ray examination of articles a case formed of material opaque to X-rays, a fluorescent screen in the case, an X-ray projection apparatus to project an X-rays towards the screen, an observation panel in the wall of the case, a reflector to reflect the image on the screen to the said panel, a hollow body to receive an article to be examined, the said body having at least a part of its periphery of curved form, a supporting system engaging the said curved periphery and supporting the body for rolling movement in the path of the X-rays, the said supporting system including a rotatable driving member, means to rotate said rotatable member and means to change the position of the axis about which said member rotates.

14. For use in X-ray examination of articles, a case formed of material opaque to X-rays, a fluorescent screen in the case, an X-ray projection apparatus to project an X-rays towards the screen, a hollow body to receive an article to be examined, the said body having at least a part of its periphery of curved form, a supporting system engaging the said curved periphery and supporting the body for rolling movement in the path of the X-rays, the said supporting system including a rotatable driving member, an electric motor to rotate said rotatable member, means to change the position of the axis about which the said body rotates, and a common control member to regulate both the motor and the means for changing the position of the axis of rotation of the body.

EDWARD ALBERT JAMES TUNNICLIFFE.